Feb. 6, 1940.  C. L. NEUMEISTER  2,189,218
TILING
Filed Dec. 6, 1937  2 Sheets-Sheet 1

Inventor
Carl L. Neumeister
By Edw. R. Hampson
Attorney

Feb. 6, 1940.　　　　C. L. NEUMEISTER　　　　2,189,218
TILING
Filed Dec. 6, 1937　　　2 Sheets-Sheet 2
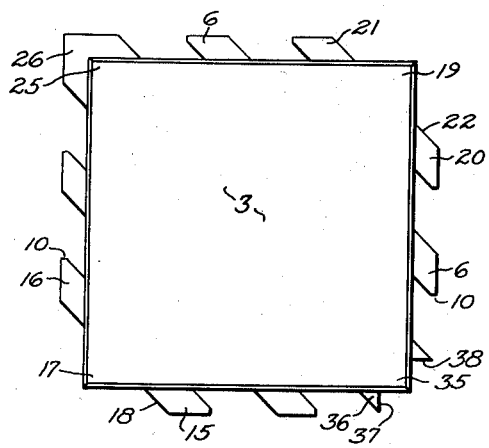
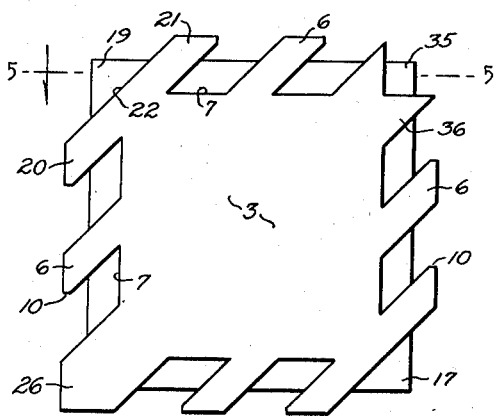
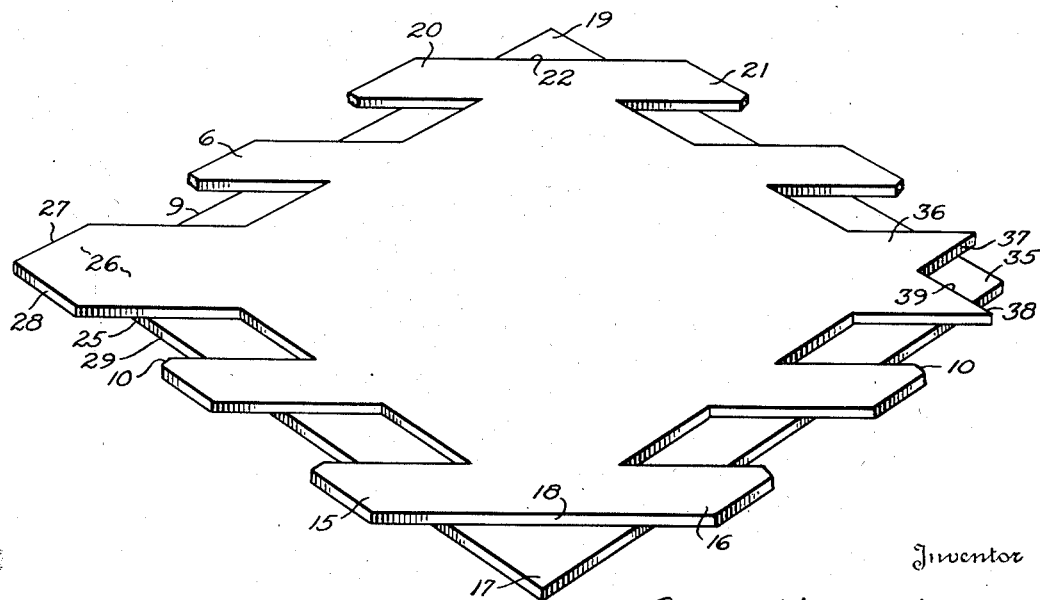
Inventor
Carl L. Neumeister.
By Edw. A. Hampson
Attorney Patented Feb. 6, 1940

2,189,218

UNITED STATES PATENT OFFICE 2,189,218

TILING

Carl L. Neumeister, Oak Park, Ill., assignor to The Celotex Corporation, Chicago, Ill., a corporation of Delaware Application December 6, 1937, Serial No. 178,490

5 Claims. (Cl. 72—25)

This invention relates to tiling and has for its object to provide a tile, and structure made therewith, which will be cheap in manufacturing costs and more efficient in use than those heretofore proposed.

With these and other objects in view the invention resides in the novel details of construction and combinations of parts as will be disclosed more fully hereinafter and particularly pointed out in the claims.

Referring to the accompanying drawings forming a part of this specification and in which like numerals designate like parts in all the views:

Fig. 3 is a top plan view of one of the tiles shown in the assembly of Fig. 1;

Fig. 4 is a bottom plan view of the tile shown in Fig. 3;

Fig. 5 is a vertical sectional view taken through a tile, said view taken as on the line 5—5 of Fig. 4, looking in the direction of the arrow; and Fig. 6 is a perspective view looking at the underside of a tile.

This invention is directed to a tile so constructed that a plurality of similar tiles can be laid in edge abutting relation in the construction of floors and walls, each tile having a plurality of projecting portions which underlie the next adjacent tile, such portions having interlocking engagement with complementally formed recesses in said adjacent tile, an important feature being that one of the projecting portions of one tile supports the abutting corners of adjacent tiles in the laid assembly of tiles. Another important feature is that the projecting portions and their companion recesses are so formed that slight sliding adjustment of one tile is made possible with respect to the next adjacent tile, in the laying of the assembly, so that the abutting edges of all tiles may be properly aligned. Each tile may be of any suitable material, either of one-piece construction or made as a laminated structure, the projections and recesses being by cutting dies, a stamp press, routing or other cutting tools, or each tile may be molded.

Figure 1:
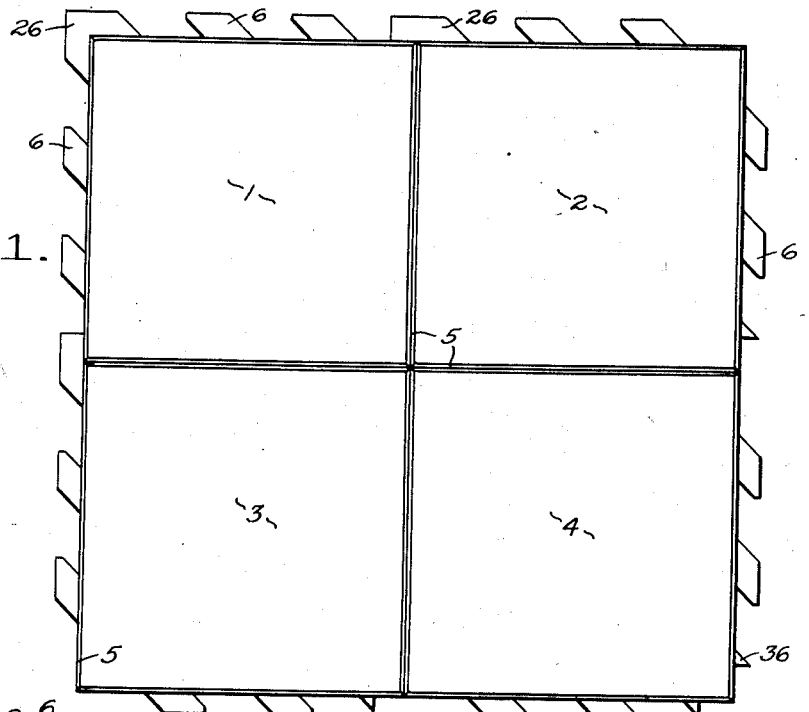
Fig. 1 is a top plan view of an assembly of tiles made in accordance with this invention and laid in abutting relation with each other.
Figure 2:
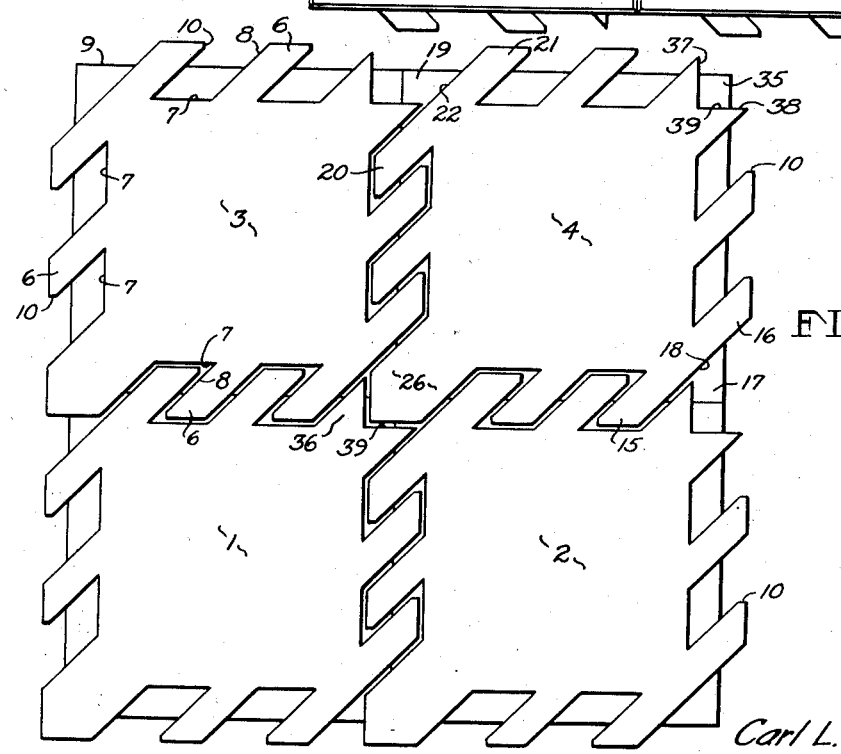
Fig. 2 is a bottom plan view of the assembly shown in Fig. 1.

Referring to Figs. 1 and 2 there is shown an assembly of four tiles generally indicated by the numerals 1, 2, 3 and 4 each tile being shown as of square shape, though tiles of other shapes are contemplated which will permit the interlocking feature later to be described. The upper or exposed face of each tile may be plain or ornamented and either planar or embossed, the tiles of Fig. 1 being illustrated as having a chamfered edge indicated at 5 to make a more pleasing appearance while reducing to a minimum the possibility of chipping or presenting sharp edges in the finished surface of the tiling.

The rear face of each tile is provided along each edge area with a plurality of alternating projections such as 6, and recesses such as 7, having common sides such as 8, and these projections and recesses may be more aptly defined as tenons and mortises respectively in that the tenon 6 has a portion projecting beyond the abutting edge 9 of a tile, as well as a portion which extends inwardly from said abutting edge, the projecting portion being slightly less in length than the inwardly extending portion. Thus it will be seen that when two similarly formed tiles are brought together in edge abutting relation, the projecting portion of a tenon 6 will extend into a mortise 7 but not to the root thereof, see Fig. 2. The width of a mortise is made slightly greater than the width of a tenon, and the sides such as 8 are disposed obliquely to the straight abutting side edge 9 of the tile, in the drawings this obliquity being of the order of 45° but other angularity may be provided. When two adjacent tiles are in proper facing registry, as seen in Fig. 1, the mortises and tenons will be interengaged as shown in Fig. 2 with substantially no portion of a tenon contacting the side or root of its coengaging mortise.

From the foregoing it will be understood that a plurality of alternating mortises and tenons are formed along each edge area of a tile, the formation being such that a portion of each tenon will extend beyond the straight abutting edge 9 of the tile a distance slightly less than the extent of the tenon inwardly from said edge, and that the mortises and tenons are cut, stamped or molded inwardly from the rear face of the tile to a suitable depth to insure relative strength in the projecting portion of each tenon. In the drawings this depth has been indicated as approximately one-half the thickness of the tile, but other depths may be suitably provided. If the tile is laminated (as indicated in Fig. 5) the bottom-most lamination may have its edge formed to provide the mortises and tenons before that lamination is cemented or otherwise secured to the other laminations to form the finished tile. In the tiles illustrated it will be seen that the tenons and mortises of a tile generally have sides which are parallely disposed to each other not only in any one edge area of the tile but in all edge areas. The angularity or obliquity of the tenons, as well as the narrow width of a tenon as compared to the width of its coengaging mortise, all contribute to the ease with which one tile may be applied to its next adjacent tile, in proper adjustment, to cause substantially accurate alignment of the tiles in the completed assembly. In this respect it is pointed out particularly that the acute angle corner of a tenon is snipped off or blunted as indicated at 10 in order to widen the entrance to a mortise thereby to facilitate entry of a tenon into its coengaging mortise when a tile is being advanced into abutting relation with a previously laid tile. This blunting also reduces to a minimum any damage to the acute angle corner of the tenon in handling or shipping.

With particular reference to Figs. 3 to 6, it is to be observed that there is a slight variance in the formation and disposition of the tenons. In other words, all of the tenons of the tile are parallel to each other but they are so spaced as to provide a tenon 15, associated with one edge of the tile, which is a continuation of a tenon 16, associated with an adjacent edge of the tile, these tenons 15 and 16 being the first tenons from the corner 17 of the tile and having the straight side 18 in common, see Fig. 6. Therefore, there is no mortise but rather an open space underlying the corner 17 of the tile. The diagonally opposite corner 19 of the tile is similarly formed in that it has adjacent thereto the two aligned and continuous tenons 20 and 21 having the side 22 in common. An intermediate corner such as 25 of the tile is provided with a tenon 26 which is of substantially double width and whose extreme outer end edges 27 and 28 are parallel respectively to the abutting edges 9 and 29 of the tile, said edges 27 and 28 being aligned with the corresponding end edges of the other tenons such as 6 associated with said tile edges.

The remaining corner 35 of the tile, diagonally opposite to the corner 25, has associated therewith a tenon 36 complementally formed with respect to, and of substantially the same width as, the tenon 26. That is to say, it is provided with two inwardly directed sides 37 and 38 to form a mortise-like recess 39 for receiving the end of a tenon of the next diagonally adjacent tile which tenon is formed similarly to the tenon 26. By referring to Fig. 2 it will therefore be seen that when four tiles are brought together, in correct assembly, a single double-width tenon such as 26 of one tile will underlie and support the meeting corners of the three adjoining tiles thereby giving full thickness of tiling at said corners, said tenon substantially filling the V-shaped mortise such as 39 of the diagonally adjacent tile and the open spaces underlying the corners such as 17 and 19 of the edge abutting adjacent tiles. The remaining interlocked tenons 6 and mortises 7 provide full thickness of tiling along the abutting edges. This full thickness is highly desirable in flooring as will be readily understood, and particularly so when the flooring tiles are made of relatively yieldable material such as wood, vegetable fiber, felt, linoleum, etc.

In laying the tiling the first tile is positioned, in the corner of the floor or wall, so that the tenons will extend in directions parallel to the line bisecting the angle formed by said corner, and the edges of the tile will parallel the sides of the corner angle. Then the next tile is applied so as to coengage its tenons with the mortises of the first laid tile and, as the second tile is advanced into side abutting relation with the first tile, it is given sliding movement along lines parallel to the inclined edges such as 8 of the tenons as well as parallel to the abutting tile edge such as 9. The relative differences of width and length between the coengaged or registered tenons and mortises, makes possible a shifting or loose interengagement sufficient to bring the second tile into edge alignment with the first laid tile. The succeeding tiles are similarly laid, preferably one row at a time, and it is thought that no additional description of such laying is necessary since it will be obvious with reference to the drawings. The tiles may be suitably secured in place as by nailing through the projecting portions of the tenons, or by employing a cement or other adhesive to the supporting medium for the tiling.

From the foregoing description it will therefore be understood that the tenons and mortises, having sides in common, are parallel to each other and that they are so formed as to be generally of the shape of a parallelogram, the general obliquity of the lengthwise dimension of a tenon with respect to the straight abutting edge of the tile being of the order of, or substantially parallel to, a diagonal of the tile. Further, the abutting edge on the front side of the tile is formed straight and continuous between two adjacent tile corners wherefore said edge is uninterrupted, the tenons and mortises being formed inwardly from the rear surface of the tile and having a thickness less than that of the tile. Lastly, the corner tenons 26 and 36, diagonally opposite each other, are made of a width substantially double that of the other tenons and are approximately centered on the diagonal of the tile so that the tenon 26, in extending beyond the confines of the abutting edge 9 and 29, will underlie and support the meeting corners of the adjoining tiles in the tiling assembly, the other tenon 36 having its end recessed as at 39 within the confines of its two contiguous abutting tile edges in order to accommodate a tenon such as 26 of an adjoining tile in the tiling assembly.

It is obvious that those skilled in the art may vary the details of construction and arrangements of parts without departing from the spirit of this invention and therefore it is desired not to be limited to the exact foregoing description except as may be demanded by the claims.

What is claimed is:

1. Tiling comprising a plurality of tiles adapted to be set edge to edge, each tile provided in its edge area with alternating tenons and mortises of complemental formation for engagement with the mortises and tenons of the next adjacent tile, said tenons and mortises having a thickness less than that of the tile, said tenons extending beyond the abutting edges of the tile, one of said tenons having substantially double-width and disposed at a corner of the tile, and said tenon adapted to underlie and support the contiguous corners of adjoining tiles in the tiling assembly.

2. Tiling comprising a plurality of tiles adapted to be set edge to edge, each tile provided in its edge area with alternating tenons and mortises of complemental formation for engagement with the mortises and tenons of the next adjacent tile, said tenons and mortises having a thickness less than that of the tile, said tenons extending beyond the abutting edges of the tile, one of said tenons having substantially double-width and approximately centered on a diagonal of the tile at a corner thereof to underlie and support the contiguous corners of adjoining tiles in the tiling assembly, the tenon at the diagonally opposite corner of the tile likewise being of substantially double-width and having its end recessed within the confines of the abutting edges of the tile to accommodate the corresponding one of said tenons of an adjoining tile.

3. Tiling comprising a plurality of tiles adapted to be set edge to edge, each tile provided in its edge area with alternating tenons and mortises of complemental formation for engagement with the mortises and tenons of the next adjacent tile, and an interlocking tenon diagonally mounted and adapted to support the contiguous corners of adjoining tiles in the tiling assembly.

4. Tiling comprising a plurality of tiles adapted to be set edge to edge, each tile having a tenon symmetrically formed at a corner of the tile, said tenon being substantially tongue shaped and extending beyond the face of the tile at the corner thereof, and another tenon formed diagonally opposite to the first mentioned tenon and adapted to abut a similarly formed tenon as the first mentioned tenon.

5. A tile for tiling having a plurality of alternately arranged tenons and mortises in each edge area, one of said tenons symmetrically formed and extending beyond the face of the tile at the corner thereof, another tenon formed diagonally opposite to the first mentioned tenon and complementally thereto; whereby, in a tiling assembly, the first mentioned tenon is adapted to underlie and support the contiguous corners of adjoining tiles, and the second mentioned tenon is adapted to receive a tenon of an adjacent tile formed as the first mentioned tenon and to underlie and support adjacent tiles.

CARL L. NEUMEISTER.